US006333762B1

(12) United States Patent
Yoo et al.

(10) Patent No.: US 6,333,762 B1
(45) Date of Patent: Dec. 25, 2001

(54) METHOD FOR MAKING LOOK-UP TABLES FOR VIDEO FORMAT CONVERTER USING THE LOOK-UP TABLES

(75) Inventors: Joong-Sun Yoo; Chang-Wan Hong; Jong-Chul Choi; Yeon-Mo Jeong, all of Kyonggi-do; Jae-Jun Lee, Seoul, all of (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/226,130

(22) Filed: Jan. 7, 1999

(30) Foreign Application Priority Data

Feb. 28, 1998 (KR) .................................................. 98-6635

(51) Int. Cl.[7] .................................................. H04N 7/01
(52) U.S. Cl. .......................... 348/441; 348/445; 348/446; 348/714; 345/601; 345/602; 345/603; 382/300
(58) Field of Search .................... 348/441, 444, 348/445, 446, 451, 452, 714, 715, 453; 382/300, 298, 299; 345/603, 601, 602, 606; H04N 7/01

(56) References Cited

U.S. PATENT DOCUMENTS

| 5,808,688 | * | 9/1998 | Sung ..................................... 348/441 |
| 5,912,711 | * | 6/1999 | Lin et al. ............................... 348/446 |
| 5,914,753 | * | 6/1999 | Donovan .............................. 348/441 |
| 6,028,589 | * | 2/2000 | Mehra et al. ......................... 345/154 |
| 6,044,178 | * | 3/2000 | Lin ....................................... 382/260 |
| 6,226,040 | * | 5/2001 | Kuo et al. ............................. 348/446 |
| 6,229,570 | * | 5/2001 | Bugwadia et al. ................... 348/441 |
| 6,233,365 | * | 5/2001 | Teruhiko .............................. 382/298 |
| 6,263,120 | * | 7/2001 | Matsuoka ............................. 382/300 |

* cited by examiner

Primary Examiner—Michael Lee
Assistant Examiner—Jean W. Désir
(74) Attorney, Agent, or Firm—Sughrue Mion, PLLC

(57) ABSTRACT

A scan format converter for converting a video format by bi-sigmoid interpolation. In the scan format converter, a memory controller has a look-up table at which first and second displacement values for pixel points of a video format to be converted are stored, controls transmission of color signals input from an external device, and reads the first and second displacement values for the pixel points of the color signals from the look-up table. A mode detector detects horizontal and vertical sync signals input from the external device and outputs a video format detection signal representing a mode of the currently input video format to the memory controller. A memory temporarily stores the color signals. A color signal logic circuit has a plurality of bi-sigmoid interpolation tables at which sigmoid interpolation values according to a color signal level difference between two pixel points are stored, and bi-sigmoid-interpolates the color signal levels of the input pixel points with respect to an x-axis and a y-axis according to the first and second displacement values input from the memory controller. A sync generator generates a sync signal to the color signal logic circuit.

9 Claims, 10 Drawing Sheets

METHOD FOR MAKING LOOK-UP TABLES FOR VIDEO FORMAT CONVERTER USING THE LOOK-UP TABLES

BACKGROUND OF THE INVENTION

1. Field of the Invention

The present invention relates to a scan format converter for converting a video format, and in particular, to a method for making look-up tables of variables and interpolation values necessary for bi-sigmoid interpolation and a scan format converter for converting an input video format to another video format by using the look-up tables.

2. Description of the Related Art

With the popularization of personal computers (PCs), there are demands for a personal computer capable of displaying a video output thereof through a display unit of a home television or a projection television. In practice, however, since there is a discrepancy in the number of the scanning lines between the television set and the personal computer, it is impossible to output various formats (e.g., SVGA, XGA, VGA, etc) input from the personal computer to the display unit, as they are. Accordingly, it is necessary to convert the input video formats in conformity with the properties of the display unit. A scan format converter has been developed for that purpose.

However, the conventional scan format converter, utilizing bi-linear interpolation or zero-order interpolation, cannot display the high quality image of the personal computer to the display unit of the television set or the projection television.

SUMMARY OF THE INVENTION

It is therefore an object of the present invention to provide a method for making look-up tables of variables and interpolation values necessary for bi-sigmoid interpolation, and a scan format converter for converting a video format by using the look-up tables.

It is another object of the present invention to provide a method for making look-up tables with which it is possible to convert a video format using bi-sigmoid interpolation, and a scan format converter for converting the video format by using the look-up tables.

It is still another object of the present invention to provide a scan format converter for a video signal processing device, which can provide fast video format conversion by using bi-sigmoid interpolation.

According to one aspect of the present invention, a method for making look-up tables for video format conversion in a video signal processing device includes the steps of calculating first and second displacement values representing that pixel points of a first video format are spaced apart from corresponding pixel points of a second video format with respect to an x-axis and a y-axis, respectively, the first video format having a different resolution from that of the second video format; tabling the calculated displacement values with respect to the respective pixel points of the second video format; and sigmoid-interpolating displacement values, in the x-axis and the y-axis, for the same pixel points between the first and second video formats and level difference values between two contiguous pixel points in the first video format, and tabling the sigmoid-interpolated level values in association with the displacement values.

According to another aspect of the present invention, a scan format converter for converting a video format by bi-sigmoid interpolation includes a memory controller having a look-up table at which first and second displacement values for pixel points of a video format to be converted are stored, for controlling transmission of color signals input from an external device, and reading the first and second displacement values for the pixel points of the color signals from the look-up table; a mode detector for detecting horizontal and vertical sync signals input from the external device and outputting a video format detection signal representing a mode of the currently input video format to the memory controller; a memory for temporarily storing the color signals; a color signal logic circuit having a plurality of bi-sigmoid interpolation tables at which sigmoid interpolation values according to a color signal level difference between two pixel points are stored, for bi-sigmoid-interpolating the color signal levels of the input pixel points with respect to an x-axis and a y-axis according to the first and second displacement values input from the memory controller; and a sync generator for generating a sync signal to the color signal logic circuit.

BRIEF DESCRIPTION OF THE DRAWINGS

The above objects and advantages of the present invention will become more apparent by describing in detail preferred embodiment thereof with reference to the attached drawings in which.

DETAILED DESCRIPTION OF THE PREFERRED EMBODIMENT

A preferred embodiment of the present invention will be described in detail hereinbelow with reference to the accompanying drawings.

First, references will be made to the characteristics of a sigmoid function and a procedure for calculating variables $n_1, n_2$, $\Delta x$ and $\Delta y$ necessary for bi-sigmoid interpolation. Subsequently, descriptions will be given of a method for look-up tables of the above variables and bi-sigmoid interpolation values in order to reduce bi-sigmoid interpolation time and simplify a design of the scan format converter. Finally, detailed descriptions will be given of the structure and operation of the scan format converter which converts a video format by using the look-up tables.

Figure 1B:
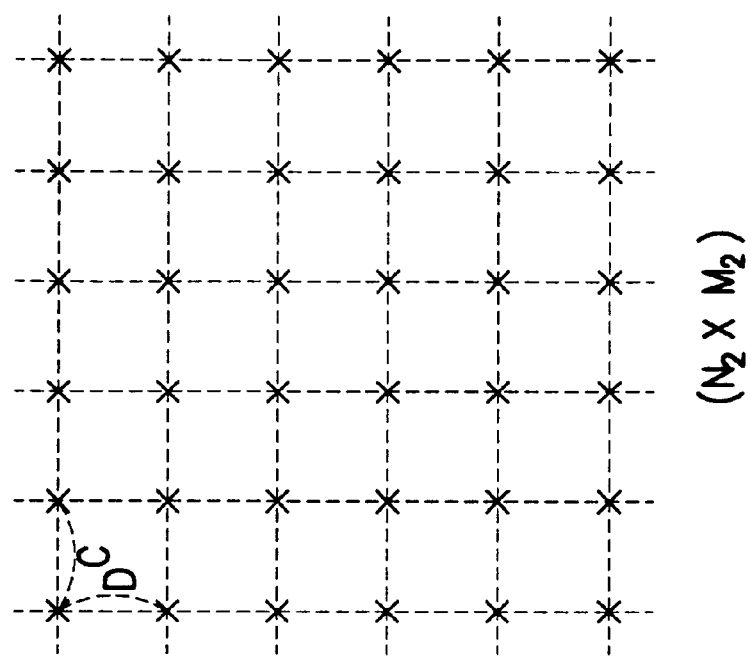
FIGS. 1A and 1B are diagrams illustrating video formats of different resolutions.
Figure 1A:
Figure 1A:
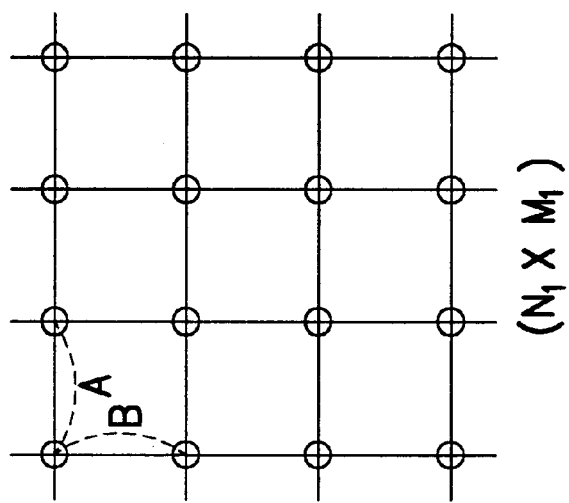
Figure 2:
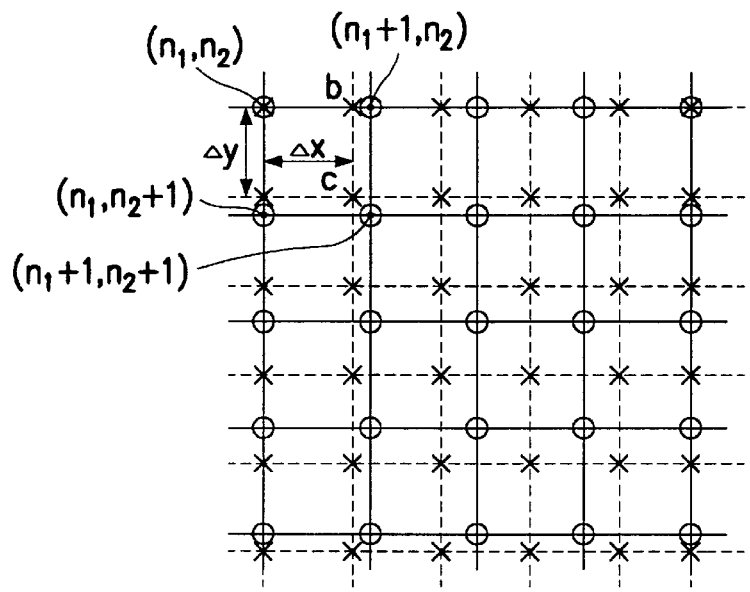
FIG. 2 is a diagram illustrating a state where the two different video formats of FIGS. 1A and 1B are overlapped.
Figure 3:
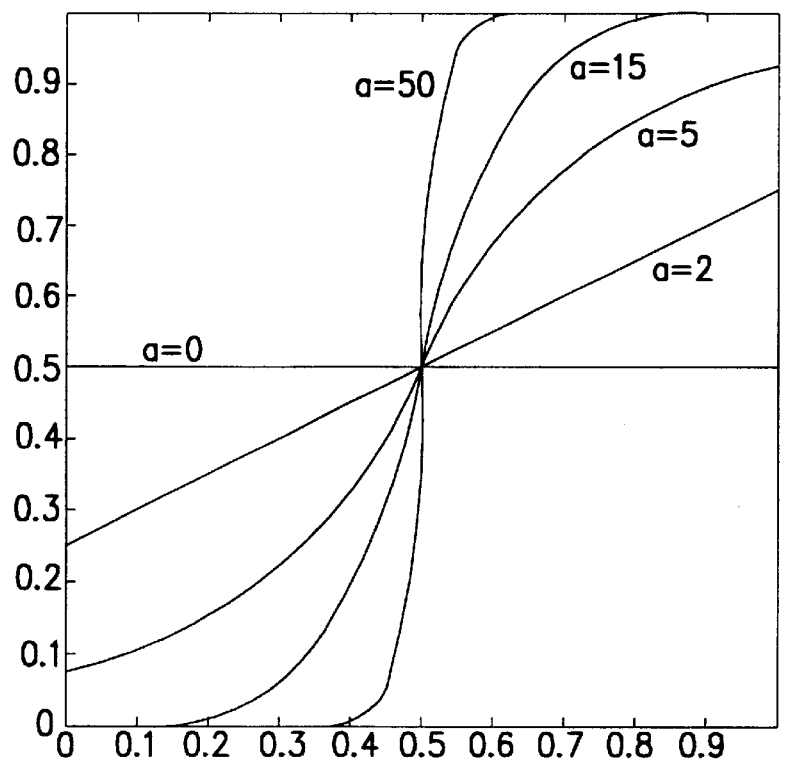
FIG. 3 is a diagram illustrating sigmoid function characteristic curves.

FIGS. 1A and 1B illustrate video formats of different resolutions, and FIG. 2 illustrates a state where the two different video formats of FIGS. 1A and 1B are overlapped. Further, FIG. 3 shows sigmoid function characteristic curves. The characteristics of the sigmoid functions will be described below with reference to FIGS. 1 to 3. First, a diagram of FIG. 2 is obtained by overlapping the video format of a low resolution $N_1 \times M_1$ show in FIG. 1A with the video format of a high resolution $N_2 \times M_2$ shown in FIG. 1B. In FIG. 2, solid lines and dotted lines represent the video formats of the low resolution and the high resolution, respectively. When up-converting the video format of the low resolution to the video format of the high resolution, a converted pixel point "c" has coordinates $(n_1+\Delta x, n_2+\alpha y)$. In such a case, the point "c" is surrounded by contiguous four sample points $(n_1,n_2)$, $(n_1+1,n_2)$, $(n_1,n_2+1)$ and $(n_1+1,n_2+1)$, and an RGB (Red, Green, Blue) level value $f_c(x,y)$ (hereinafter, called a level value for short) of the point "c" is derived from level values $f(n_1,n_2)$, $f(n_1+1,n_2)$, $f(n_1,n_2+1)$ and $f(n_1+1,n_2+1)$ of the contiguous pixel points through the bi-sigmoid interpolation. Specifically, the sigmoid function $s(x)$ is expressed by a following equation (1).

$$s(x) = \frac{1}{1+e^{-\alpha(x-d)}} \quad (1)$$

where x represents an input, and $\alpha$ represents a constant for controlling the characteristic of the sigmoid function. Referring to FIG. 3, as the value $\alpha$ decreases toward zero, the sigmoid function $s(x)$ becomes more linear, whereas it changes into a threshold function as the value $\alpha$ increases. This implies that interpolation using the sigmoid function can provide various image levels more naturally, as compared with using linear interpolation.

Figure 4:
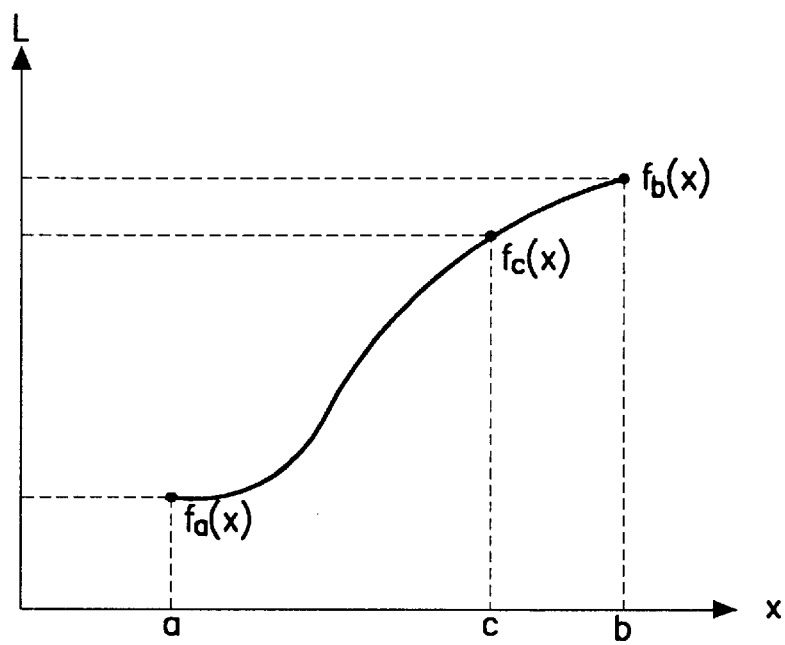
FIG. 4 is a diagram illustrating a sigmoid function characteristic curve for explaining how to determine a level value at a point "c" on the x-axis during video format conversion.

FIG. 4 illustrates a sigmoid function characteristic curve for explaining the procedure of determining a level value at a point "c" on the x-axis during video format conversion. Referring to FIG. 4, a level value $f_c(x)$ of the point "c" can be determined as a level value at a point where the sigmoid function curve between points "a" and "b" on the x-axis meets an imaginary vertical line at the point "c". Applying the same method to the y-axis, a level value $f_c(x,y)$ at the point "c" can be determined from the level values $f(n_1,n_2)$, $f(n_1+1,n_2)$, $f(n_1,n_2+1)$ and $f(n_1+1,n_2+1)$ of the pixel points contiguous to the point "c" shown in FIG. 2 by the following equation (2).

$$f_c(x,y) = \left(1-\frac{1}{1+e^{-\alpha_x(\Delta x-0.5)}}\right)\left(1-\frac{1}{1+e^{-\alpha_y(\Delta y-0.5)}}\right)f(n_1,n_2) + \\ \left(1-\frac{1}{1+e^{-\alpha_x(\Delta x-0.5)}}\right)\left(1-\frac{1}{1+e^{-\alpha_y(\Delta y-0.5)}}\right)f(n_1,n_2+1) + \\ \left(1-\frac{1}{1+e^{-\alpha_x(\Delta x-0.5)}}\right)\left(1-\frac{1}{1+e^{-\alpha_y(\Delta y-0.5)}}\right)f(n_1+1,n_2) + \\ \left(1-\frac{1}{1+e^{-\alpha_x(\Delta x-0.5)}}\right)\left(1-\frac{1}{1+e^{-\alpha_y(\Delta y-0.5)}}\right)f(n_1+1,n_2+1) \quad (2)$$

where $\alpha_x$ and $\alpha_y$ are variables representing the sigmoid function characteristics of the x-axis and the y-axis, respectively. Here, equation (2) is a formula for the bi-sigmoid interpolation. In practice, however, it is next to impossible to convert the video format using the equation (2), because it is necessary not only to evaluate the values $n_1$, $n_2$, $\Delta x$, $\Delta y$, $\alpha_x$ and $\alpha_y$ to calculate the RGB level interpolation values at a point to be converted, but also to design hardware for performing various operations including an exponential function.

Therefore, to solve these problems, the present invention first makes look-up tables $N_2$ and $M_2$ where the variables $n_1$, $n_2$, $\Delta x$ and $\Delta y$ for the respective pixel points of a video format to be converted are previously stored, and then makes a look-up table T where the bi-sigmoid interpolation values at a point to be converted are previously stored, thereby realizing the video format conversion using the bi-sigmoid interpolation.

Next, reference will be made to a method for making the look-up tables $N_2$ and $M_2$, where the values $n_1$, $n_2$, $\Delta x$ and $\Delta y$ are stored, and a method for minimizing the size of the look-up tables $N_2$ and $M_2$ by using the regularity detected in overlapping the video formats.

Assuming that the video format of the low resolution is converted to the video format of the high resolution as shown in FIG. 2 (up-conversion), coordinates of the point "c" to be converted can be determined by following equations (3) and (4):

$$(N_1/N_2) \times n_a = n_1 \cdot \Delta x \quad (3)$$

$$(M_1/M_2) \times n_b = n_2 \cdot \Delta y \quad (4)$$

where $n_1$ and $n_2$ represent integer portions, and $\Delta x$ and $\Delta y$ represent the remaining portions of the calculation results. As a result, the coordinates at the point "c" can be determined by calculating the values $n_1$, $n_2$, $\Delta x$ and $\Delta y$ based on the equations (3) and (4). However, in the exemplary embodiment, the scan format converter utilizes the look-up tables $N_2$ and $M_2$ where the calculated values $n_1$, $n_2$, $\Delta x$ and $\Delta y$ are previously stored, instead of calculating the values $n_1$, $n_2$, $\Delta x$ and $\Delta y$ by using the equations (3) and (4). This is to reduce interpolation delay due to the operations, thereby contributing to simplification of the hardware.

Figure 5:
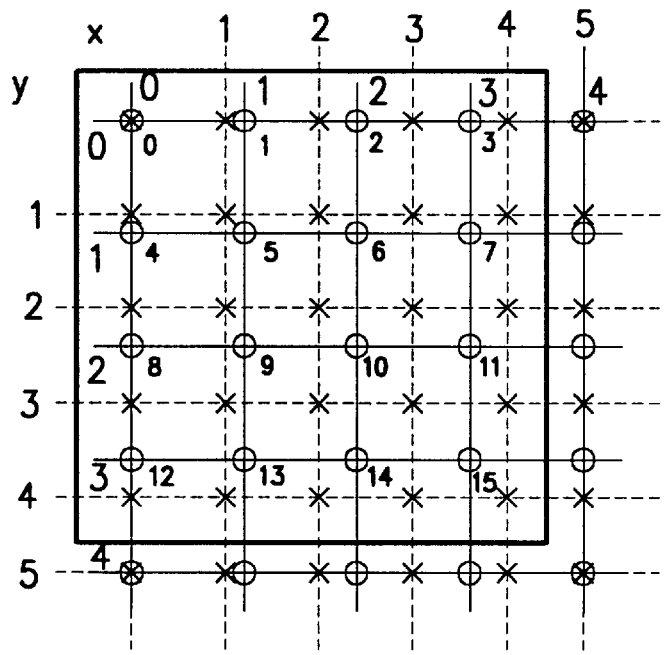
FIG. 5 is a diagram for explaining a regularity occurring when two different video formats are overlapped.
Figures 6, 7A, 7B:
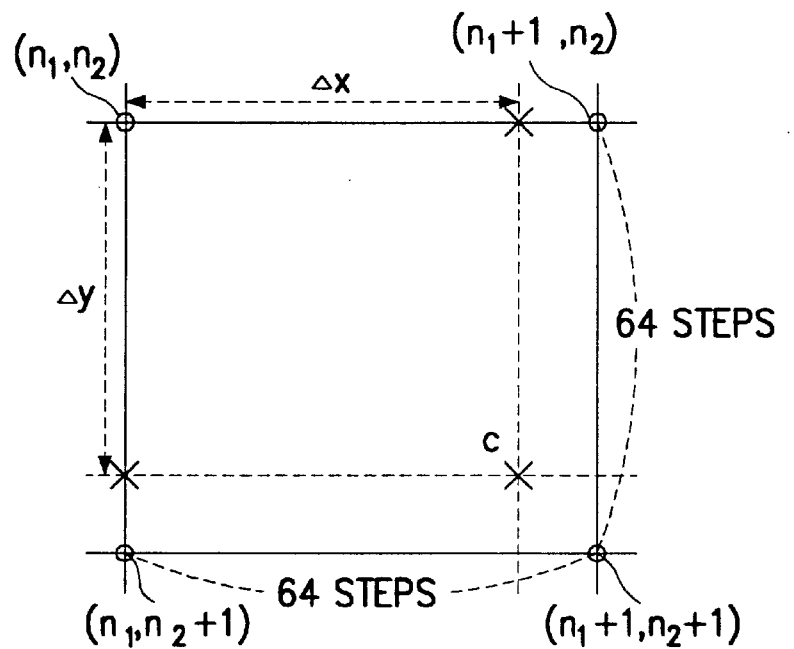
FIG. 6 is a partially enlarged diagram of FIG. 5.
FIGS. 7A and 7B are diagrams illustrating look-up tables ($N_2$ and $M_2$) according to an embodiment of the present invention.

Next, a method for making the look-up tables $N_2$ and $M_2$ will be described. FIG. 5 illustrates a regularity occurring when two different video formats are overlapped, FIG. 6 is a partially enlarged diagram of FIG. 5, and FIGS. 7A and 7B illustrate the look-up tables $N_2$ and $M_2$ according to an embodiment of the present invention, respectively. In FIGS. 5 and 6, it is assumed that "o"s represent a video format of a 640×480 resolution, and "x"s represent a video format of a 800×600 resolution. On this assumption, 800 ($n_x,\Delta x$) values and 600 ($n_y,\Delta y$) values are necessary for the video format conversion to the high resolution. Accordingly, it is possible to make the look-up tables $N_2$ and $M_2$ of FIGS. 7A and 7B by previously calculating the variables necessary for the video format conversion. In this case, $n_x$ and $n_y$ can by fully expressed with 10 bits. Assuming that $\Delta x$ and $\Delta y$ both have 64-step values as shown in FIG. 6, they can be expressed with 6 bits. Accordingly, the total size of the look-up tables $N_2$ and $M_2$ is about 2.8 Kb (=2 Bytes×(800+600)).

As to the regularity between the two video formats being overlapped, when overlapping, for example, a VGA format of a 640×480 resolution with an SVGA format of a 800×600 resolution in order to convert the VGA format to the SVGA format, there exists a box defined by four "ⓧ"s where "x"s and "y"s of the different video formats are completely overlapped. That is, a 5$^{th}$ line of the SVGA format regularly overlaps with a 4$^{th}$ line of the VGA format. As a result, when converting a video format of the 640×480 resolution to a video format of the 800×600 resolution, there exist 160 (=640/4) boxes in the horizontal direction and 120 (=480/4) boxes in the vertical direction. Due to the regularity stated above, the values Δx and Δy in the same box are changed, and the respective boxes have the same values.

Next, reference will be made to a method for making another look-up table T (hereinafter referred to as a bi-sigmoid interpolation look-up table) necessary for the bi-sigmoid interpolation.

Figure 8:
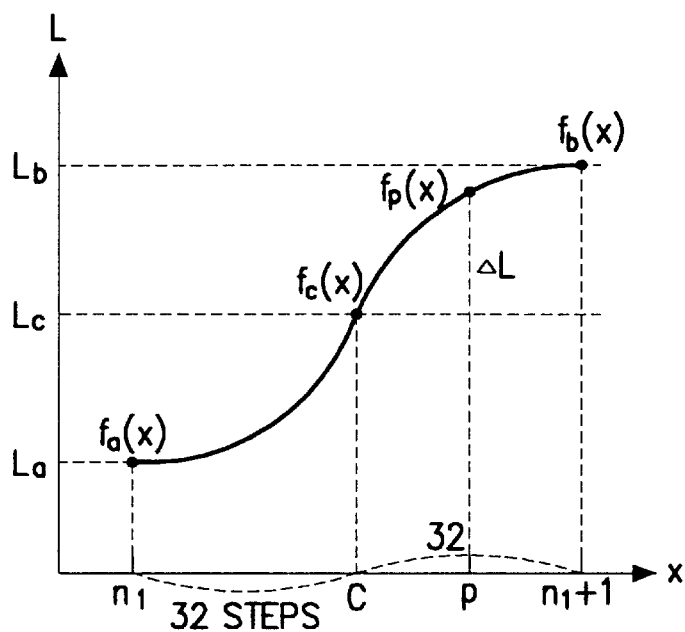
FIG. 8 is a diagram illustrating a sigmoid function characteristic curve for explaining a symmetry of the sigmoid function.

FIG. 8 illustrates an exemplary sigmoid function characteristic curve for explaining the symmetry thereof. In FIG. 8, La and Lb represent level values $f_a(x)$ and $f_b(x)$ at the points $n_1$ and $n_1+1$, respectively, and Lc represents a sigmoid-interpolated level value $f_c(x)$ at an intermediate point "C" between the points $n_1$ and $n_1+1$. Further, a point "P" represents a point of the high resolution video format to be converted, and $f_p(x)$ represents a level value of the sigmoid function characteristic at the point "P". As shown in FIG. 8, the general interpolation functions (including the sigmoid and linear functions) are symmetrical on the basis of the intermediate point "C" between two contiguous pixels. As a result, if the sigmoid function constant "α" used for the interpolation is determined, the shape of the sigmoid function curve is determined by the difference between the level values $f_a(x)$ and $f_b(x)$.

Figure 9A:
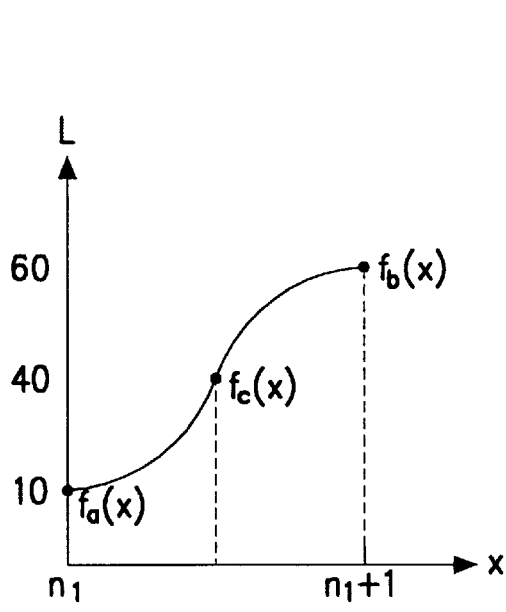
FIGS. 9A and 9B are diagrams illustrating sigmoid function characteristic curves which are variable according to a difference between level values of two pixels.
Figure 9B:
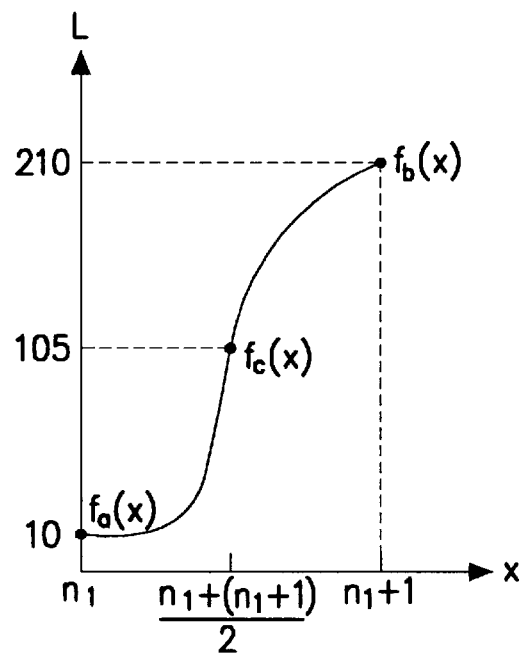

FIGS. 9A and 9B illustrate the sigmoid function characteristic curves which are variable according to the level difference between the two pixel points used for the interpolation. Specifically, FIG. 9A illustrates the sigmoid function characteristic curve when the level difference between the two pixel points $n_1$ and $n_1+1$ is 50, and FIG. 9B illustrates the sigmoid function characteristic curve when the level difference is 200. Namely, since the maximum level difference between the two pixel points is 256, the sigmoid function has 256 curves, when the constant "α" of the sigmoid function is determined. Further, the sigmoid function curves are symmetrical on the basis of the level value $f_c(x)$ as shown in FIGS. 9A and 9B. Thus, when the level values for half of the sigmoid function curve are known, it is possible to predict the level values for the remaining half. That is, 128 level values from $f_a(x)$ to $f_c(x)$ or from $f_c(x)$ to $f_b(x)$ are selectively stored. Therefore, it is possible to create the bi-sigmoid interpolation table T having a size of about 7K bytes (=7 bits×32 steps×256) as shown in Table 1, by multiplying the bit number (7 bits) necessary for displaying 128 levels which is half of 256 levels by a displacement (32 steps, since the displacement between two pixels is assumed to be 64 steps in FIG. 6) between the intermediate point and the point $n_1$ or $n_1+1$ and the total number (i.e., 256) of the variable curves.

TABLE 1

| Displacement | Shape of Graph |
|---|---|
| 0 | 0 1 2 3 4 5 . . . 255 |
| 1 | . |
| 2 | . |
| . | . |
| . | . |
| 31 | . |

Now, description will be made of the structure and operation of the scan format converter which calculates the bi-sigmoid interpolation value at a point to be converted by using the look-up tables $N_2$, $M_2$ and T.

Figure 10:
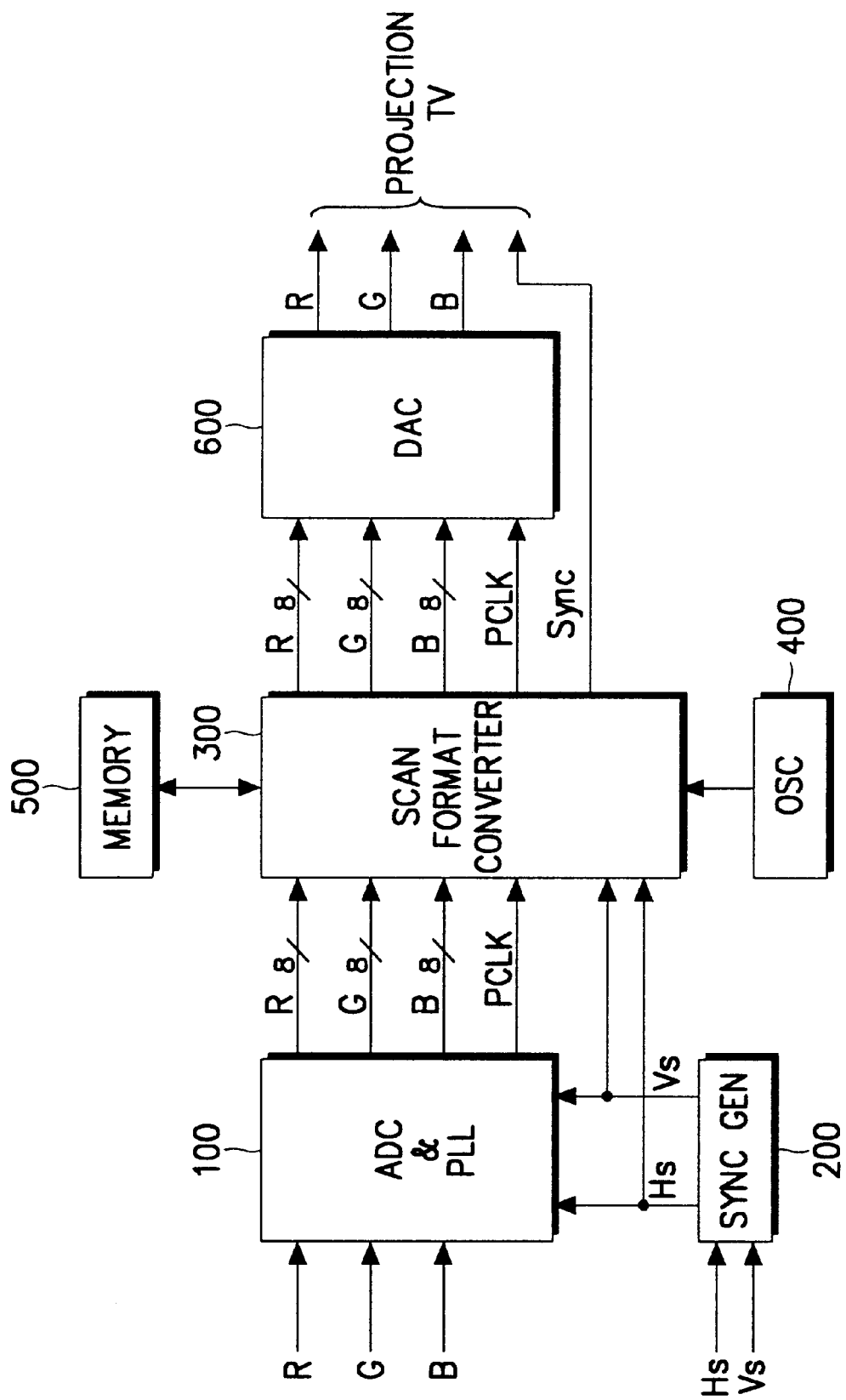
FIG. 10 is a block diagram of a scan format converter connected to its peripheral blocks according to an embodiment of the present invention.
Figure 11:
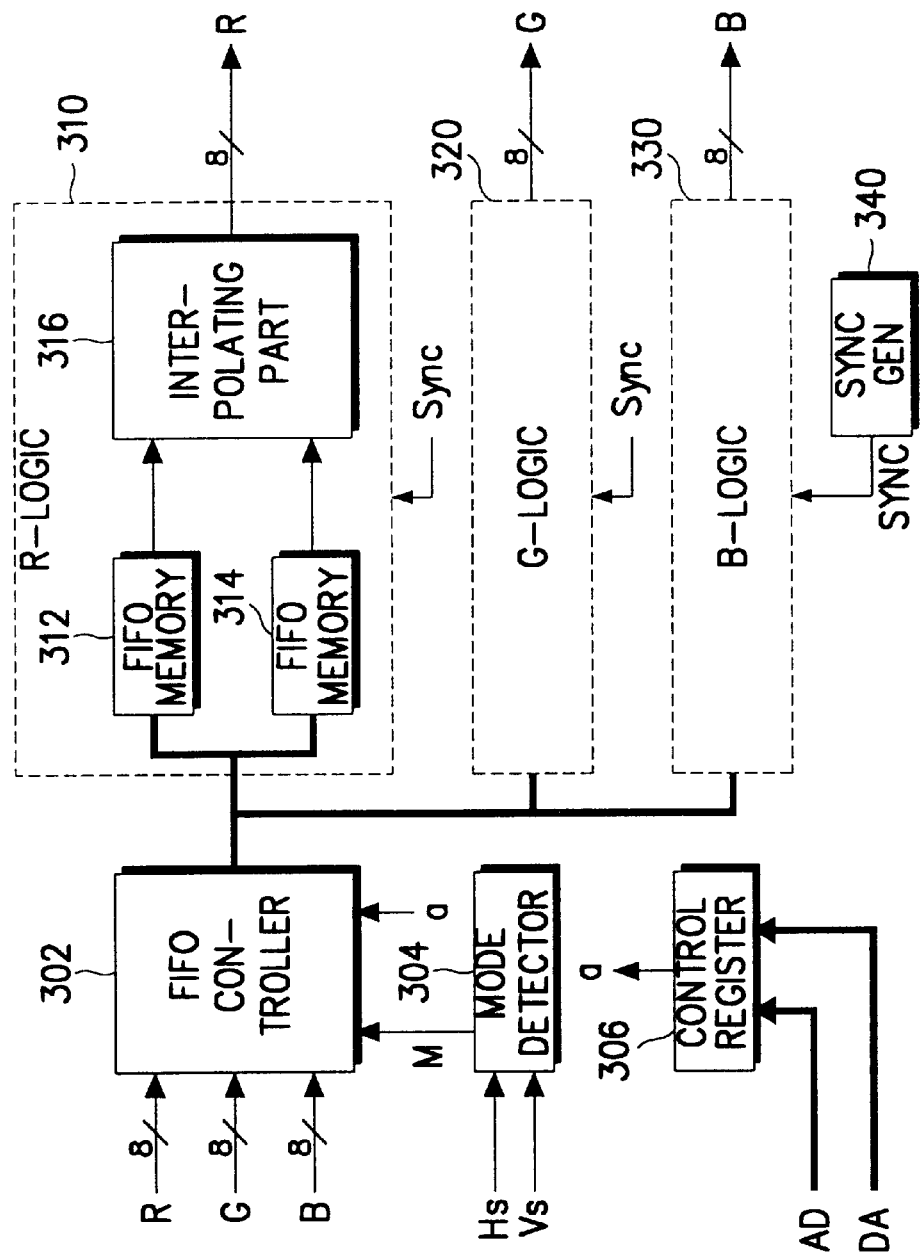
FIG. 11 is a detailed block diagram of the scan format converter (300) of FIG. 10.

FIG. 10 illustrates a block diagram of a scan format converter connected to its peripheral blocks according to an embodiment of the present invention, and FIG. 11 illustrates a detailed block diagram of a scan format converter 300 of FIG. 10. Further, FIGS. 12A through 12C illustrate a detailed block diagram of an interpolating part 316 of FIG. 11.

Referring to FIG. 10, an ADC & PLL (Analog-to-Digital Converter & Phase Locked Loop) 100 converts RGB signals input from a personal computer or a set-top box to digital data. A sync generator 200 receives horizontal and vertical sync signals Hs and Vs input from the personal computer or the set-top box and outputs the horizontal and vertical sync signals in the positive state only. That is, because the horizontal and vertical sync signals of the various video formats have a negative or positive state, it is necessary to select the sync signals in the positive state only. Meanwhile, the scan format converter 300 according to an embodiment of the present invention bi-sigmoid-interpolates 8-bit RGB signal levels input from the ADC & PLL 100 to convert them to the high or low resolution video format. An oscillator 400 generates clock pulses necessary for bi-sigmoid-interpolating the RGB signal levels and provides the generated clock pulses to the scan format converter 300. A memory 500 stores data input from the ADC & PILL 100. A DAC (Digital-to-Analog Converter) 600 converts the bi-sigmoid-interpolated RGB signal levels to analog RGB signals to provide them to the display unit of the projection television. The scan format converter 300 is illustrated in detail in FIG. 11.

Referring to FIG. 11, logic circuits 310, 320 and 330 bi-sigmoid-interpolate the R, G and B signal levels, respectively. A FIFO (First-In, First-Out) controller 302 controls transmission of the 8-bit R, G and B signals to FIFO memories 312 and 314 included in the respective logic circuits 310, 320 and 330. A mode detector 304 generates a video format detection signal M indicative of a mode of the video format input from the personal computer or the set-top box, according to the input horizontal and vertical sync signals Hs and Vs of the positive state. A control register 306 sets the constant α for controlling the sigmoid function characteristic, in response to external commands AD and DA. Further, each of the logic circuits 310, 320 and 330 includes the FIFO memories 312 and 314, and an interpolating part 316 connected to the outputs of the FIFO memories 312 and 314, for bi-sigmoid-interpolating the video format input from the external device to convert it to a new video format of the high or low resolution.

Figure 12A:
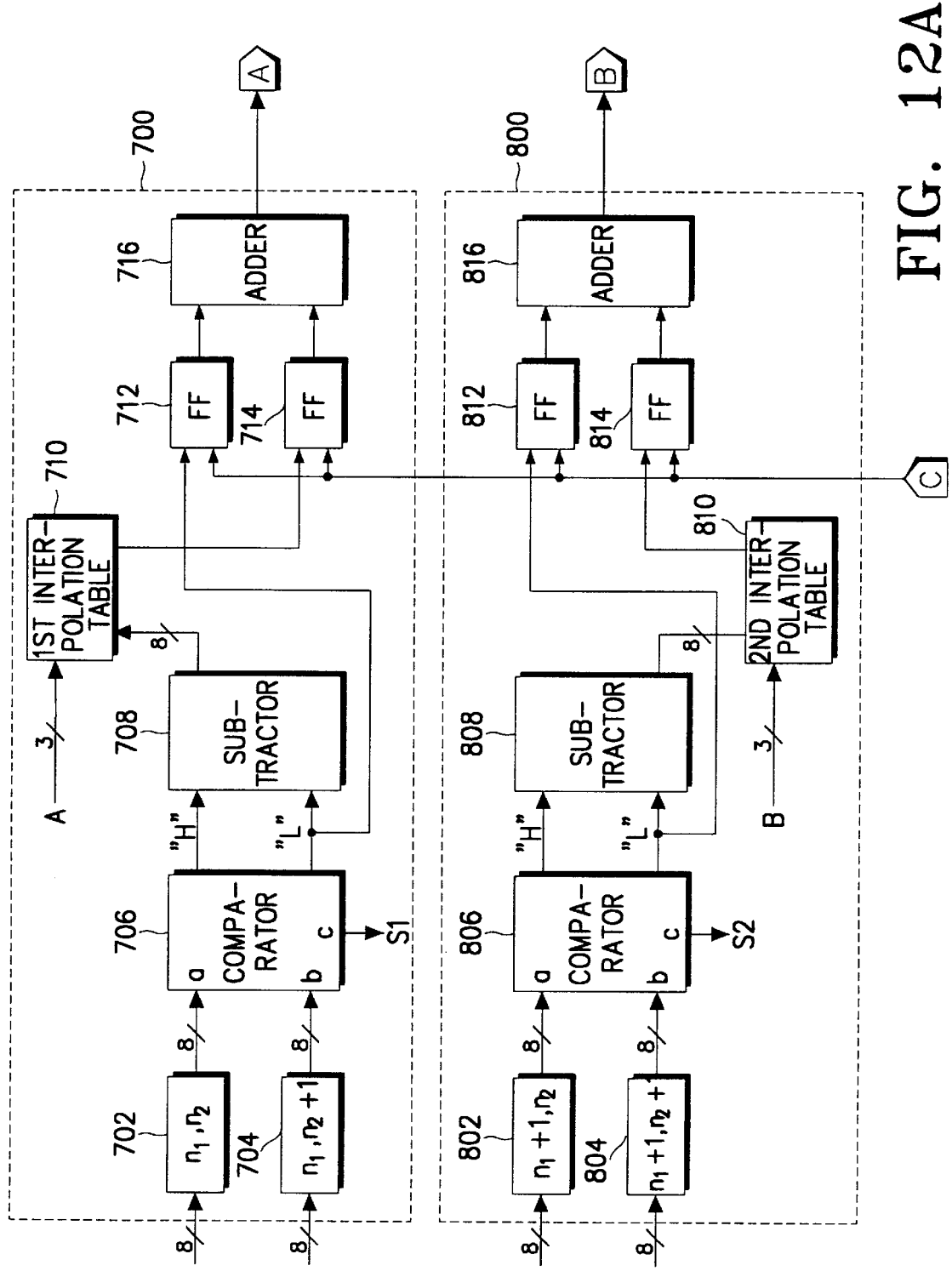
FIGS. 12A through 12C are detailed block diagrams of an interpolating part (316) of FIG. 11.
Figure 12B:
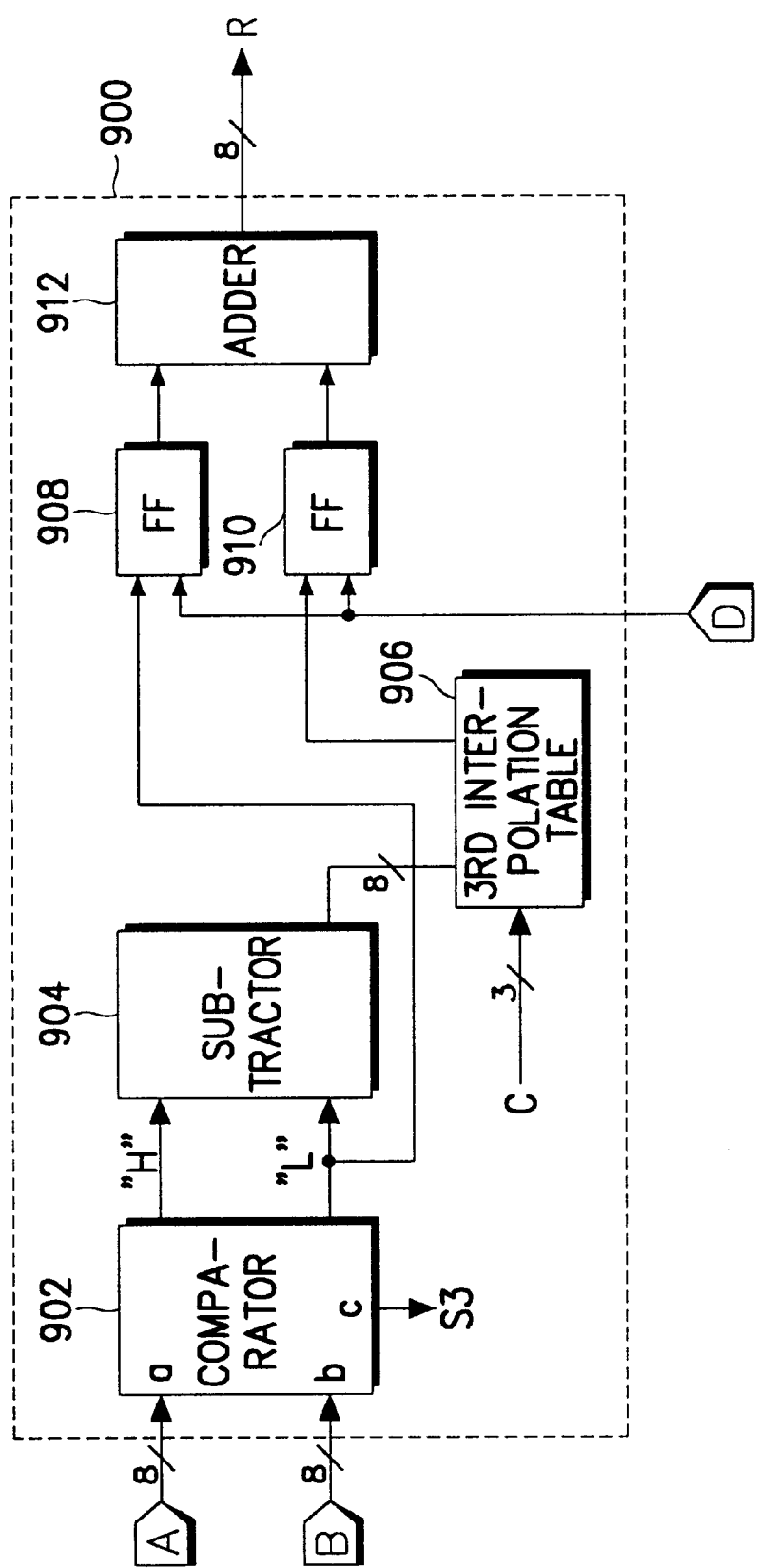
Figure 12C:
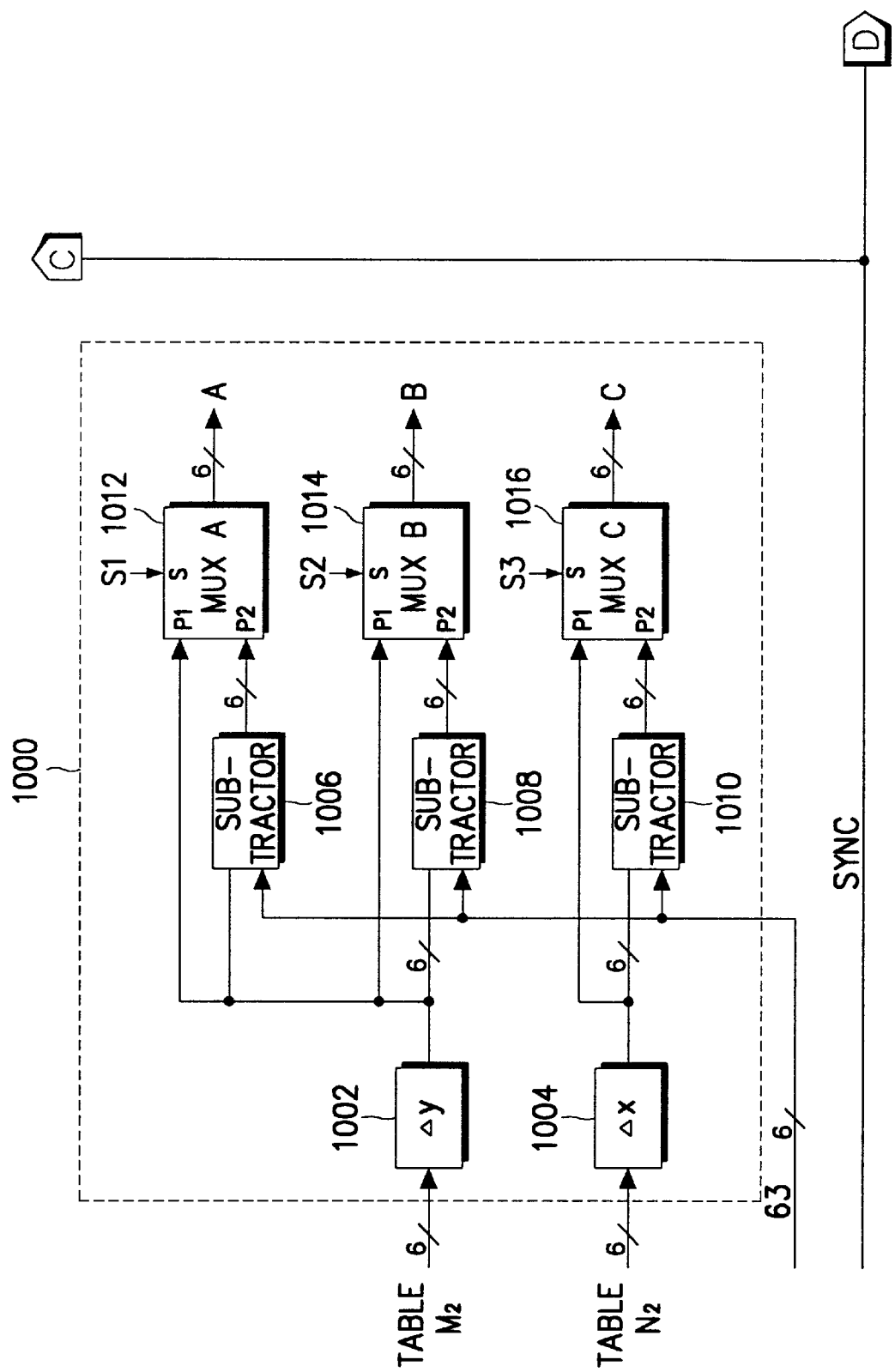

Referring to FIGS. 12A to 12C, the interpolating part 316 included in the logic circuits 310 consists of first to third level interpolators 700, 800 and 900, and a displacement calculator 1000.

In the first level interpolator 700, first and second registers 702 and 703 temporarily store the R signal levels of the two pixels ($n_1,n_2$) and ($n_1,n_2+1$), output respectively from the FIFO memories 312 and 314 of FIG. 11. A comparator 706 compares the R signal level output from the first register 702 with the R signal level output from the second register 704 and generates a selection signal S1 according to a difference between the R signal levels. For example, the comparator 706 generates the selection signal S1 of the "low" level when the R signal level at the pixel point ($n_1,n_2$) is higher than the R signal level at the pixel point ($n_1,n_2+1$), and otherwise, generates the selection signal S1 of the "high" level. Furthermore, in the comparator 706, the relatively higher and lower level values out of the input level values are applied to a subtracter 708 through lines "H" and "L", respectively. The subtracter 708 subtracts the level value on the line "L" from the level value on the line "H" to calculate the difference between the R signal levels of the two pixel points, and outputs the level difference to a first interpolation table 710. Here, a value output from the first interpolation table 710 is the level difference value which determines a shape of the graphs (curves) in Table 1. The first interpolation table 710 is a bi-sigmoid interpolation table T having the structure of Table 1. Accordingly, the first interpolation table 710 outputs a level value (represented with 7 bits in Table 1) corresponding to the level difference value input from the subtracter 708 and a displacement value A output from a multiplexer 1012 in the displacement calculator 1000. In the meantime, a flip-flop 712 outputs the R signal level of the "low" level on the line "L" in response to a sync signal output from the sync generator 340 of FIG. 11. Moreover, a flip-flop 714 outputs a level value output from the first interpolation table 710 in response to the sync signal. An adder 716 adds the value output from the flip-flop 712 to the value output from the flip-flop 714. As a result, the first level interpolator 700 primarily interpolates the R signal level value between the two pixel points $(n_1,n_2)$ and $(n_1,n_2+1)$ with respect to the y-axis, thereby generating a first interpolation value $L_{\Delta y1}$ to a comparator 902 of the third level interpolator 900.

As to the second level interpolator 800, it has the same structure as that of the first level interpolator 700. That is, the second level interpolator 800 secondarily interpolates the R signal level value between the two pixel points $(n_1+1,n_2)$ and $(n_1+1,n_2+1)$ output from the FIFO memories 312 and 314 of FIG. 11, with respect to the y-axis. A second interpolation table 810 also has the same structure as that of the first interpolation table 710 in the first level interpolator 700. An adder 816 adds an output value of a flip-flop 812 to an output value of a flip-flop 814. As a result, the second level interpolator 800 outputs a second interpolation value $L_{\Delta y2}$ by secondarily interpolating the R signal level value between the two pixel points $(n_1+1,n_2)$ and $(n_1+1,n_2+1)$ with respect to the y-axis. The second interpolation value $L_{\Delta y2}$ is also input to the comparator 902 in the third level interpolator 900.

Next, as for the third level interpolator 900, it has the same structure as that of the first and second level interpolators 700 and 800 except that it does not include the registers 702, 704, 802 and 804. That is, the third level interpolator 900 thirdly interpolates the first and second interpolation values $L_{\Delta y1}$ and $L_{\Delta y2}$ from the first and second level interpolators 700 and 800 with respect to the x-axis, thereby generating a third interpolation value which is a bi-sigmoid-interpolated R signal level value at the pixel point to be converted. Further, a third interpolation table 906 in the third level interpolator 900 also has the same structure as that of the first and second interpolation tables 710 and 810.

Now, referring to FIG. 12C, the displacement calculator 1000 provides the first to third level interpolators 700, 800 and 900 with the displacement values A, B and C. Specifically, a 6-bit displacement value $\Delta y$ read from the table $M_2$ in the FIFO controller 302 is temporarily stored in a fifth register 1002 and then output to subtracters 1006 and 1008 and input nodes P1 of multiplexers 1012 and 1014. Further, a 6-bit displacement value $\Delta x$ read from the table $M_2$ in the FIFO controller 302 is temporarily stored in a sixth register 1004 and then output to a subtracter 1010 and an input node P1 of a multiplexer 1016. The subtracters 1006, 1008 and 1010 each subtract the displacement values $\Delta y$ and $\Delta x$ input from the registers 1002 and 1004 from the maximum displacement value between the two pixel points on the same axis. In the embodiment, since the maximum displacement value between the two pixel points is divided into 64 steps as shown in FIG. 6, the values output from the subtracters 1006, 1008 and 1010 are 63–$\Delta y$, 63–$\Delta y$ and 63–$\Delta x$, respectively. The multiplexers 1012, 1008 and 1016 selectively output the values from the registers 1002 and 1004 or the subtracters 1006, 1008 and 1010 according to the selection signals S1, S2 and S3 output from the level interpolators 700, 800 and 900, respectively. For example, when the selection signal S1 is at the "low" level, it means that an R signal level value of a first pixel point $(n_1,n_2)$ on a first horizontal line is higher than an R signal level value of a first pixel point $(n_1,n_2+1)$ on a second horizontal line. At this moment, the multiplexer 1012 outputs the displacement value A of $\Delta y$. Accordingly, the first interpolation table 710 outputs a level value corresponding to the displacement value $\Delta y$ and the 8-bit level difference value output from the subtracter 708. Here, the first interpolation table 710 outputs the first interpolation value $L_{\Delta y1}$ which is primarily sigmoid-interpolated with respect to the y-axis, by adding the output level value to the relatively lower R signal level value of the pixel point out of the two pixel points. On the contrary, however, when the selection signal S1 is at the "high" level, it is meant that the R signal level value of the first pixel point $(n_1,n_2)$ on the first horizontal line is lower than the R signal level value of the first pixel point $(n_1,n_2+1)$ on the second horizontal line. At this moment, the multiplexer 1012 outputs the displacement value A of $-(63-\Delta y)$. Accordingly, the first interpolation table 710 outputs a level value corresponding to the displacement value $(63-\Delta y)$ and the 8-bit level difference value output from the subtracter 708. Here, the first interpolation table 710 outputs the first interpolation value $L_{\Delta y1}$ which is primarily sigmoid-interpolated with respect to the y-axis, by adding the output level value to the relatively lower R signal level value of the pixel point out of the two pixel points. In this manner, the multiplexers 1012, 1014 and 1016 each generate the displacement values A, B and C which vary according to the level values of the pixel points between the contiguous horizontal lines.

Now, operation of the scan format converter according to the present invention will be described in detail with reference to FIGS. 10 to 12C. In the embodiment, it is assumed that the scan format converter 300 according to the present invention includes the look-up tables $N_2$ and $M_2$ for converting an input SVGA video format to a VGA video format. In addition, it is assumed that the pixel points on a first horizontal line have the level values higher than the level values of the pixel points on a second horizontal line.

The RGB signals of a video format having 800×600 resolution, input from the personal computer, are converted to 8-bit digital data in the ADC & PLL 100 and then applied to the scan format converter 300. The 8-bit digital data is transferred to the logic circuits 310, 320 and 330 and then stored in the FIFO memories 312 and 314 of the respective logic circuits, under the control of the FIFO controller 302. Here, the FIFO memories 312 and 314 record and output the level values of pixel points on two contiguous horizontal lines on a first-in-first-out basis. That is, the FIFO controller 302 controls the FIFO memory 312 to store the R signal level value of the first pixel point $(n_1,n_2)$ on the first horizontal line in the first register 702 of FIG. 12A and store the R signal level value of the second pixel point $(n_1+1,n_2)$ on the first horizontal line in the third register 802. Further, the FIFO controller 302 controls the FIFO memory 314 to store the R signal level value of the first pixel point $(n_1,n_2+1)$ on the second horizontal line in the second register 704 and store the R signal level value of the second pixel point ($n_1+1,n_2+1$) on the second horizontal line in the fourth register 804. The level values stored in the registers 702, 704, 802 and 804 are simultaneously output to the comparators 706 and 806, under the control of the FIFO controller 302. The comparators 706 and 806 compare the R signal level values of the two pixel points with each other and generate the selection signals of the "low" level according to the comparison results. The subtracters 708 and 808 calculate level difference values between the R signal levels of the two pixels input from the comparators 706 and 806, respectively, and output the level difference values to the first and second interpolation tables 710 and 810. Here, the level difference value between the first pixel point on the first horizontal line and the first pixel point on the second horizontal line is input to the first interpolation table 710, and the level difference value between the second pixel point on the first horizontal line and the second pixel point on the second horizontal line is input to the second interpolation table 810.

Meanwhile, the mode detector 304 of FIG. 11 detects the SVGA format from the input horizontal and vertical sync signals Hs and Vs, and generates a video format detection signal M for notifying the detection of the SVGA format to the FIFO controller 302. Upon receipt of the video format detection signal M, the FIFO controller 302 reads the displacement values $\Delta x$ and $\Delta y$ corresponding to the respective pixel points of the VGA format from the look-up tables $N_2$ and $M_2$. The displacement values $\Delta x$ and $\Delta y$ output from the FIFO controller 302 are stored in the first and second registers 1002 and 1004 of the displacement calculator 1000, and then output in sync with the R signal level values stored in the first to fourth registers 702, 704, 802 and 804. The output displacement values $\Delta x$ and $\Delta y$ are input to the multiplexers 1012, 1014 and 1016, and the subtracters 1006, 1008 and 1010. The multiplexers 1012 and 1014 output the displacement values $\Delta y$ to the first and second interpolation tables 710 and 810 according to the selection signals S1 and S2 of the "low" level input from the first and second level interpolators 700 and 800, respectively.

Therefore, in the first interpolation table 710, the 7-bit level value corresponding to the level difference and the displacement value A between the first pixel point on the first horizontal line and the second pixel point on the second horizontal line is input to the first flip-flop 714. In the second interpolation table 810, the 7-bit level value corresponding to the level difference and the displacement value B between the second pixel point on the first horizontal line and the second pixel point on the second horizontal line is input to the second flip-flop 814. In the adder 716 of the first level interpolator 700, the level value of the first pixel point on the second horizontal line is added to the output value of the first interpolation table 710 and then input to the comparator 902 of the third level interpolator 900. In the adder 816 of the second level interpolator 800, the level value of the second pixel point on the second horizontal line is added to the output value of the second interpolation table 810 and then input to the comparator 902 of the third level interpolator 900.

The first and second interpolation values $L_{\Delta y1}$ and $L_{\Delta y2}$ which are obtained through the sigmoid interpolation with respect to the first and second pixel points on the two horizontal lines are then compared in the comparator 902, thereby generating the selection signal S3 to the multiplexer 1016 in the displacement calculator 1000 according to the comparison results. The multiplexer 1016 outputs the displacement value $\Delta x$ (or $63+\Delta x$) according to the selection signal S3 to the third interpolation table 906. The third interpolation table 906 outputs, as the R signal level value, the third interpolation value $L_{\Delta y3}$ corresponding to the level difference between the first and second interpolation values $L_{\Delta y1}$ and $L_{\Delta y2}$ and the displacement value $\Delta x$ (or $63+\Delta x$). Here, the R signal level value is a value obtained by sigmoid-interpolating the first and second interpolation values $L_{\Delta y1}$ and $L_{\Delta y2}$ with respect to the x-axis, and this value is converted to the analog signal in the DAC 600 and then output to the display unit of the projection television. In the same manner as described above, the logic circuits 320 and 330 generate bi-sigmoid-interpolated G and B signals to the display unit of the projection television, respectively. Therefore, the projection television can display a high quality video image having 640×480 resolution on its display unit.

As described above, the scan format converter of the invention can display various video formats (e.g., SVGA, XGA and VGA) input from the external device such as a personal computer or a set-top box on a display unit of a projection television or a home television, without degradation of the image quality. Furthermore, it is possible to prevent degradation of the image quality which may be caused due to a discrepancy in the number of the scanning lines between the video formats, by using the sigmoid function characteristics during conversion of the video format. Besides, the scan format convert has the look-up tables of the variables necessary for calculating the bi-sigmoid interpolation values and the final interpolation value, thereby contributing to simplification of the hardware and fast conversion of the video format.

While the present invention has been described in detail with reference to the specific embodiment of the present invention, it is a mere exemplary application. Thus, it is to be clearly understood that many variations can be made by anyone skilled in the art within the scope and spirit of the present invention.

What is claimed is:

1. A method for making look-up tables for video format conversion in a video signal processing device, comprising the steps of:

calculating first and second displacement values representing that pixel points of a first video format are spaced apart from corresponding pixel points of a second video format with respect to an x-axis and a y-axis, respectively, said first video format having a different resolution from that of the second video format;

tabling said calculated displacement values with respect to the respective pixel points of the second video format; and sigmoid-interpolating level values, with respect to the x-axis and the y-axis, for the same pixel points between the first and second video formats and level difference values between two contiguous pixel points in the first video format, and tabling said sigmoid-interpolated level values in association with said displacement values.

2. The method as claimed in claim 1, where said first and second displacement values are calculated by equations represented by $$(N_1/N_2) \times n_a = n_1 \cdot \Delta x$$

$$(M_1/M_2) \times n_b = n_2 \cdot \Delta y$$

where, $n_1$ and $n_2$ represent pixel points of the first video format;

Δx and Δy represent said first and second displacement values; and $n_a$ and $n_b$ represent pixel points of the second video format being spaced apart from said pixel points $n_1$ and $n_2$ by said first and second displacement values.

3. A scan format converter using bi-sigmoid interpolation, comprising:

a memory controller having a look-up table at which first and second displacement values for pixel points of a video format to be converted are stored, for controlling transmission of color signals input from an external device, and reading the first and second displacement values for the pixel points of the color signals from said look-up table;

a memory for temporarily storing said color signals;

a color signal logic circuit having a plurality of bi-sigmoid interpolation tables at which sigmoid interpolation values according to a color signal level difference between two pixel points are stored, for bi-sigmoid-interpolating the color signal levels of the input pixel points with respect to an x-axis and a y-axis according to the first and second displacement values input from said memory controller; and a sync generator for generating a sync signal to said color signal logic circuit.

4. The scan format converter as claimed in claim 3, wherein said color logic circuit comprises:

a displacement calculator for varying the first and second displacement values input from the memory controller in response to a level comparison result between the two pixel points;

a first level interpolator for reading, from a first bi-sigmoid interpolation table thereof, a level value corresponding to the first displacement value output from the displacement calculator and a color signal level difference between contiguous pixel points on a first horizontal line, and outputting a first interpolation value by adding said level value read from said first bi-sigmoid interpolation table to one of the color signal values for said contiguous pixel points on the first horizontal line, which is relatively lower than another;

a second level interpolator for reading, from a second bi-sigmoid interpolation table thereof, a level value corresponding to the first displacement value output from the displacement calculator and a color signal level difference between contiguous pixel points on a second horizontal line, and outputting a second interpolation value by adding said level value read from said second bi-sigmoid interpolation table to one of the color signal values for said contiguous pixel points on the second horizontal line, which is relatively lower than another; and a third level interpolator for reading, from a third bi-sigmoid interpolation table thereof, a level value corresponding to the second displacement value output from the displacement calculator and a level difference between the first and second interpolation values, and outputting a third interpolation value by adding said level value read from said third bi-sigmoid interpolation table to one of said first and second interpolation values, which is relatively lower than another.

5. The scan format converter as claimed in claim 4, wherein said first and second level interpolators each comprise:

first and second registers for storing the color signal level values of first and second contiguous pixel points on the first horizontal line output from the memory, respectively;

a comparator for comparing the level value output from the first register with the level value output form the second register, and outputting a selection signal of a logic level depending upon the comparison result to the displacement calculator;

a subtracter for calculating a difference value between the level values input from the comparator;

a bi-sigmoid interpolation table for outputting a level value corresponding to the displacement values and the level difference input respectively from the displacement calculator and the subtracter;

a first flip-flop for outputting the level value output from the bi-sigmoid interpolation table in sync with the sync signal;

a second flip-flop for outputting the lower signal level out of the levels output from the comparator in sync with the sync signal; and an adder for adding the level value output from the first flip-flop to the level value output from the second flip-flop.

6. The scan format converter as claimed in claim 4, wherein said third level interpolator comprises:

a comparator for comparing an output of the first level interpolator with an output of the second level interpolator, and outputting a selection signal of a logic level depending upon the comparison result to the displacement calculator;

a subtracter for calculating a difference value between the level values input from the comparator;

a bi-sigmoid interpolation table for outputting a level value corresponding to the displacement values and the level difference input respectively from the displacement calculator and the subtracter;

a first flip-flop for outputting the level value output from the bi-sigmoid interpolation table in sync with the sync signal;

a second flip-flop for outputting the lower signal level out of the levels output from the comparator in sync with the sync signal; and an adder for adding the level value output from the first flip-flop to the level value output from the second flip-flop.

7. The scan format converter as claimed in claim 5, wherein said bi-sigmoid interpolation tables of said first and second level interpolators have the same structure and values.

8. The scan format converter as claimed in claim 4, wherein said displacement calculator comprises:

first and second registers for storing the first and second displacement values output from the memory controller;

first and second subtracters for subtracting the displacement value output from the first register from a maximum displacement value output from the memory controller;

a third subtracter for subtracting the displacement value output from the second register from the maximum displacement value output from the memory controller; and a plurality of multiplexers each having an input node connected to one of the outputs of the subtracters and another input node connected to outputs of the first and second registers, for selectively outputting a displacement value according to the logic level of the selection signal output from the level interpolators.

9. A scan format converter for converting a video format by bi-sigmoid interpolation, comprising:

a memory controller having a look-up table at which first and second displacement values for pixel points of a video format to be converted are stored, for controlling transmission of color signals input from an external device, and reading the first and second displacement values for the pixel points of the color signals from said look-up table;

a mode detector for detecting horizontal and vertical sync signals input from the external device and outputting a video format detection signal representing a mode of the currently input video format to the memory controller;

a memory for temporarily storing said color signals;

a color signal logic circuit having a plurality of bi-sigmoid interpolation tables at which sigmoid interpolation values according to a color signal level difference between two pixel points are stored, for bi-sigmoid-interpolating the color signal levels of the input pixel points with respect to an x-axis and a y-axis according to the first and second displacement values input from said memory controller; and a sync generator for generating a sync signal to said color signal logic circuit.

* * * * *